(12) United States Patent
Bello et al.

(10) Patent No.: US 9,417,903 B2
(45) Date of Patent: Aug. 16, 2016

(54) STORAGE MANAGEMENT FOR A CLUSTER OF INTEGRATED COMPUTING SYSTEMS COMPRISING INTEGRATED RESOURCE INFRASTRUCTURE USING STORAGE RESOURCE AGENTS AND SYNCHRONIZED INTER-SYSTEM STORAGE PRIORITY MAP

(71) Applicant: International Business Machines Corporation, Armonk, NY (US)

(72) Inventors: Adekunle Bello, Pflugerville, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/923,863

(22) Filed: Jun. 21, 2013

(65) Prior Publication Data

US 2014/0380303 A1 Dec. 25, 2014

(51) Int. Cl.
| | | |
|---|---|---|
| G06F 9/455 | (2006.01) | |
| G06F 3/06 | (2006.01) | |
| G06F 17/30 | (2006.01) | |
| H04L 29/08 | (2006.01) | |
| G06F 15/16 | (2006.01) | |
| G06F 15/173 | (2006.01) | |

(52) U.S. Cl.
CPC .......... *G06F 9/45558* (2013.01); *G06F 3/0604* (2013.01); *G06F 3/067* (2013.01); *G06F 15/161* (2013.01); *G06F 15/17343* (2013.01); *G06F 17/302* (2013.01); *G06F 2009/4557* (2013.01); *G06F 2009/45579* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,500,053 B1 * | 3/2009 | Kavuri | .................. | G06F 3/0605 709/226 |
| 8,307,187 B2 | 11/2012 | Chawla et al. | | |
| 8,316,110 B1 * | 11/2012 | Deshmukh | .......... | G06F 11/1438 709/202 |

(Continued)

FOREIGN PATENT DOCUMENTS

| | | |
|---|---|---|
| EP | 0179401 A2 | 4/1986 |
| EP | 1851629 A1 | 11/2007 |

OTHER PUBLICATIONS

Bello, et al., "Improving Data Placement Optimization," filed Feb. 11, 2013, U.S. Appl. No. 13/764,064.

(Continued)

*Primary Examiner* — Abu Ghaffari
(74) *Attorney, Agent, or Firm* — Gregory M. Nordstrom; Bryan Bortnick

(57) ABSTRACT

Integrated computing systems with independently managed infrastructures including compute nodes and storage nodes form a cluster. Storage resource agents manage storage resources in the cluster. The resource agents identify storage requirements associated with allocation sets for resource consumers dispatched in the cluster, communicate with each other to locate inter-system storage resources that primarily satisfy locality criteria associated with resource consumer workloads, secondarily satisfy allocation set activity criteria associated with the allocation sets, and allocate the storage resources to the resource consumers to satisfy the storage requirements. The storage resource agents may base storage assignments on data placement information from a priority map. Data may be later relocated to alternate storage resources in satisfaction of cluster-wide storage policies, priority determinations, and data access rate determinations.

20 Claims, 5 Drawing Sheets

(56) References Cited

U.S. PATENT DOCUMENTS

| | | | |
|---|---|---|---|
| 8,352,941 B1* | 1/2013 | Protopopov et al. ............... 718/1 |
| 8,725,979 B1* | 5/2014 | Jennings ................... G06F 3/06 |
| | | | 707/999.2 |
| 9,189,265 B2* | 11/2015 | Hiltgen ............... G06F 9/45558 |
| 2004/0073677 A1* | 4/2004 | Honma ................. G06F 3/0604 |
| | | | 709/226 |
| 2005/0071482 A1* | 3/2005 | Gopisetty et al. ............. 709/229 |
| 2008/0263390 A1* | 10/2008 | Baba et al. ........................ 714/4 |
| 2008/0313641 A1* | 12/2008 | Inoue ..................... G06F 3/061 |
| | | | 718/104 |
| 2010/0153617 A1 | 6/2010 | Miroshnichenko et al. |
| 2012/0054739 A1* | 3/2012 | Arakawa et al. .................. 718/1 |
| 2012/0150930 A1 | 6/2012 | Jin et al. |
| 2012/0179802 A1* | 7/2012 | Narasimhan .......... H04L 41/046 |
| | | | 709/223 |
| 2012/0240112 A1* | 9/2012 | Nishiguchi et al. ............... 718/1 |
| 2013/0007741 A1* | 1/2013 | Britsch ................. G06F 9/4401 |
| | | | 718/1 |
| 2013/0238752 A1* | 9/2013 | Park .................... H04L 67/1097 |
| | | | 709/217 |
| 2014/0075494 A1* | 3/2014 | Fadida et al. ..................... 726/1 |

OTHER PUBLICATIONS

Anonymous, "IBM SAN Volume Controller," en.wikipedia/org/wiki/IBM_SAN_Volume_Controller (last modified Mar. 26, 2013).

Anonymous, "VPLEX," en.wikipedia.org/wiki/VPLEX (last modified Jun. 6, 2013).

* cited by examiner

STORAGE MANAGEMENT FOR A CLUSTER OF INTEGRATED COMPUTING SYSTEMS COMPRISING INTEGRATED RESOURCE INFRASTRUCTURE USING STORAGE RESOURCE AGENTS AND SYNCHRONIZED INTER-SYSTEM STORAGE PRIORITY MAP

BACKGROUND

This disclosure relates generally to data storage resource management in computing environments, and more particularly to storage allocation and data placement for a cluster of integrated computing systems. An integrated computing system has a comprehensive infrastructure combining servers, storage, networking, virtualization, and management into a single integrated system.

SUMMARY

Systems and methods are disclosed for managing storage resources in a cluster of integrated systems. Each integrated system has an independently managed infrastructure including compute nodes and storage nodes. Each integrated system is associated with a storage resource agent that identifies storage requirements for resource consumers dispatched on virtual machines hosted on compute nodes in the integrated system. The storage requirements are associated with allocation sets and the resource consumers are associated with workloads. The storage resource agents are in communication with each other, and they locate candidate storage resources on storage nodes in other integrated systems. Each candidate storage resource is associated with a locality measurement that satisfies locality criteria for the workload. In some embodiments, the locality measurement is higher than a predetermined threshold. In some embodiments, the locality measurement is among the top number of possible locality measurements available in the cluster, or among the top percentage of possible locality measurements available in the cluster.

Storage resources that satisfy allocation set activity criteria are selected from the candidate storage resources. In some embodiments, the selected storage resources were previously associated with the allocation sets. In some embodiments, the selected storage resources were previously associated with the workloads or the resource consumers. These selected inter-system storage resources are then allocated to the resource consumers to satisfy the storage requirements. In some embodiments, the storage resource agents may access a priority map associating the resource consumers with data placement information and may base inter-system storage assignments on the data placement information from the priority map. In some embodiments, data is later relocated to alternate storage resources on alternate storage nodes in alternate integrated systems to satisfy relocation criteria. Such relocation criteria may include cluster-wide storage policies, priority determinations, and data access rate determinations.

BRIEF DESCRIPTION OF THE DRAWINGS

In the figures and description, like numbers generally refer to like components, parts, steps, and processes.

DETAILED DESCRIPTION

Figure 1:
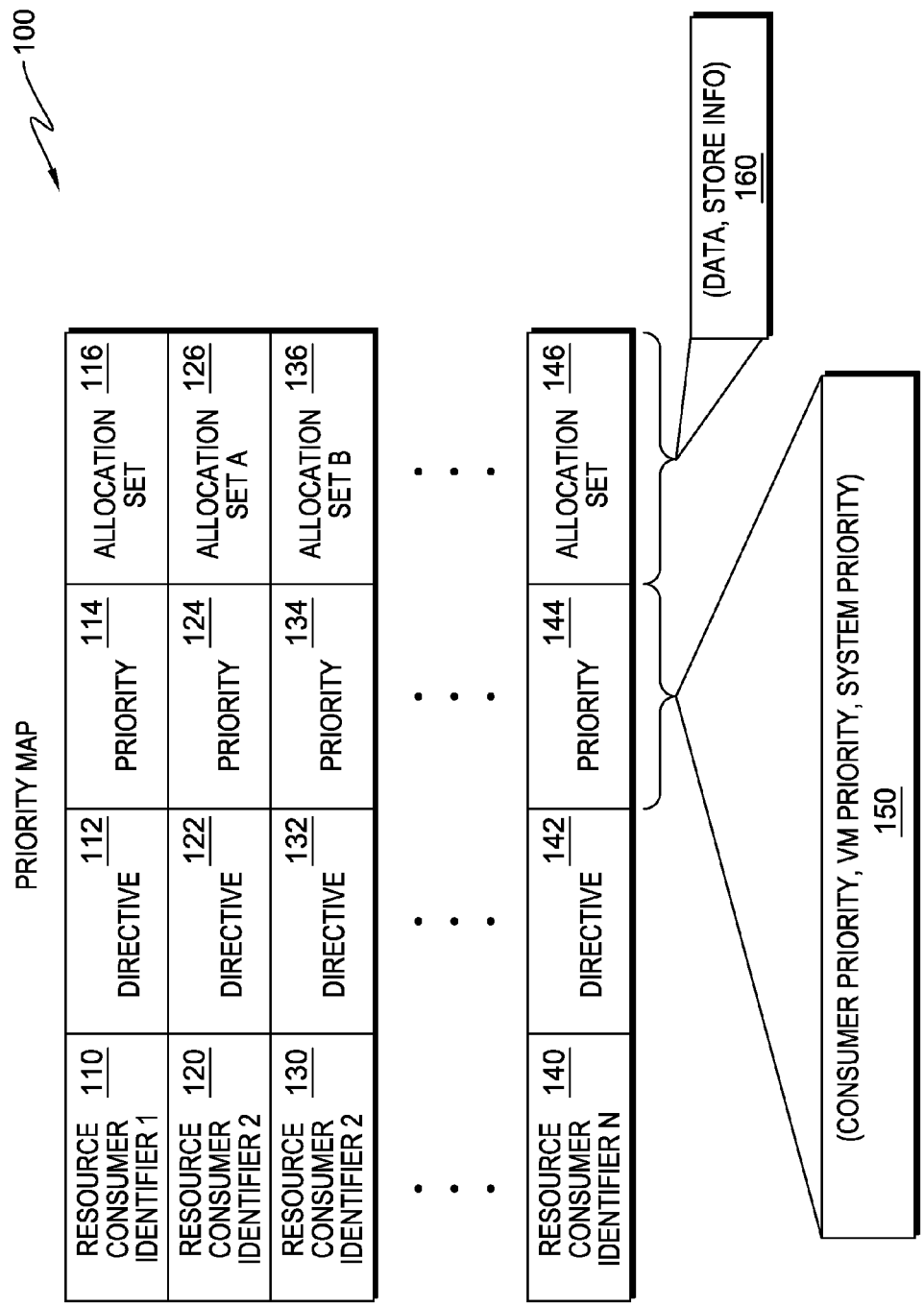
FIG. 1 is a block diagram of an example priority map for use in a system for storage management in a cluster of integrated computing systems.

Applications, service providers, and other consumers of storage resources in computing systems often run on operating systems dispatched on virtual machines. These virtual machines may be physically hosted on one or more compute nodes, and may be assigned storage resources from one or more storage nodes. Often these storage nodes are physically in remote locations relative to the compute nodes. Virtualization processes in the computing system make the storage resources appear as local resources to the operating systems on the virtual machine. For example, a storage resource on a physically remote storage node may appear as a local disk to an operating system. The virtualization process obscures the physical path to the physical storage from the resource consumer, and the actual physical location of the storage resource can change with little or no disruption to applications and services.

Integrated computing systems, sometimes referred to as "flex systems", have a comprehensive infrastructure combining servers, storage, networking, virtualization, and management into a single integrated system. Such integrated computing systems can quickly and automatically adapt to changing conditions in order to meet today's complex and ever-changing business demands, thus enabling organizations to manage and flexibly deploy integrated patterns of virtual and physical resources through unified management. Since an integrated computing system provides storage nodes integrated with compute nodes and network nodes, it may sometimes be described as a "cloud-ready" box.

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Cloud computing may allow access to virtual computing resources (e.g., storage, data, applications, and even complete virtualized computing systems) in "the cloud," without regard for the underlying physical systems (or locations of those systems) used to provide the computing resources.

Because data use levels in an integrated system can grow over time, possibly exceeding the available intra-system storage bandwidth and causing storage resource consumers to experience increased and possibly unacceptable storage access rates, and because storage resources in an integrated system are not immune to failure, service providers may want to cluster multiple integrated systems into an expanded environment. For example, a cloud service provider may accumulate multiple integrated systems to form a cluster of clouds. Clustering multiple integrated systems provides an opportunity to optimize storage allocation across the entire cluster, but a unifying storage management process is needed to allow multiple independently managed integrated systems to benefit from the larger storage resource pool. Such a unifying storage management process should attempt to minimize the effects of inter-system storage allocation on critical processes. Because a resource consumer dispatched on compute nodes in a first integrated system can have its storage requirements fulfilled by storage nodes from a different integrated system, i.e., inter-system storage nodes, there is a need to balance storage allocation across the cluster with the performance needs of the individual applications and other resource consumers operating in the cluster.

Resource consumer performance can be affected by the resource consumer's workload's locality. "Locality" measures how efficiently a workload's data allocation sets can be accessed. The length of the transmission paths between the storage nodes in the cluster and the virtual machines hosted on the compute nodes in the cluster, as well as the number and type of routers, switches, and other devices on the transmission paths can affect locality. A workload with a high locality measurement is generally more efficient than the same workload with a lower locality measurement. The selection and allocation of specific storage resources to satisfy storage requirements for a resource consumer's workload may affect the locality measurement for the workload.

Disclosed herein are embodiments of a dynamic storage provisioning framework for a cluster of integrated systems that manage placement of data across all available storage in the cluster. Embodiments may take into consideration the unique characteristics of storage resource consumers operating within the cluster. Resource selection decisions may be based primarily on workload locality, and secondarily on whether the resource had a previous association with the workload data. Data placement policies may favor intra-system storage solutions when possible, may favor an even distribution of data across storage units when practical, and may dynamically adjust to changes in patterns of workload demand.

In some embodiments, the storage requirements of resource consumers within a cluster of integrated systems should be met as quickly as possible, for example to maximize application performance. Data placed on inter-system storage nodes can be relocated later, for example to increase locality, to minimize the number of inter-system data placements in the cluster, to maximize the number of intra-system data placements in the cluster, or to balance the distribution of available storage resources in the cluster.

The importance or criticality of individual storage requirements may also be a factor in data placement. For example, the storage needs of high priority resource consumers or of resource consumers with frequently accessed data may be met sooner and/or with superior storage resources than the storage needs of lower priority resource consumers or those with less frequently accessed data. Superior storage resources may be, for example, those that improve the locality of resource consumer's workload. As the needs of the applications and other storage resource consumers in the cluster change, data placement policies and other inter-system storage criteria may also change to aid in maintaining optimal storage access for resource consumers.

As stated above, inter-system storage criteria may include data placement policies. Inter-system storage criteria may also include various directives, such as a directive indicating that a particular resource consumer is or is not eligible for inter-system data storage, or a directive indicating that particular data is or is not eligible for inter-system data storage. Inter-system storage criteria may also include various determinations, such as a determination that particular data has an access rate above or below an access rate threshold, or a determination that a particular resource consumer has a priority above or below a priority threshold, or a determination that a particular resource consumer has a higher or lower priority than a competing resource consumer.

Storage management for a cluster of integrated systems may begin with building a storage topology of the cluster. The storage topology identifies the transmission paths between the storage nodes in the cluster and the virtual machines hosted on the compute nodes in the cluster. This may require identifying the storage bandwidth for each compute node on each integrated system in the cluster, and may require identifying the total available storage and LUN definitions on each storage node on each integrated system in the cluster. This topology may then be used to build a prioritized mapping of the paths between the storage resource consumers dispatched on the virtual machines and the storage resources on the storage nodes. Higher priority mappings may have a better effect on locality than lower priority mappings.

A priority map may rely on information about the relative importance of the individual resource consumers and/or their associated data, the individual virtual machines, and even the individual integrated systems. For example, each integrated system may be assigned a priority or "weight" relative to the other integrated systems in the cluster. This "system priority" may range, for example, from 1 to a defined maximum system priority. Likewise, each virtual machine may be assigned a priority or weight relative to other virtual machines. This "virtual machine priority" may be relative to the other virtual machines in the integrated system, and may range, for example, from 1 to a defined maximum virtual machine priority. Furthermore, each application (or other resource consumer) running on a virtual machine may be assigned a priority or weight relative to other applications on the virtual machine. This "consumer priority" may range, for example, from 1 to a defined maximum consumer priority. These individual priorities may be set initially during a configuration process for the cluster, may be imported from a previous configuration process, for example during integrated system configuration, or may be set using a different process. Additionally, individual priorities may remain constant or may adapt to runtime or other conditions. Although specific individual priorities are referenced here, it is contemplated that some embodiments may rely on only some of these priorities, or additional priorities not referenced here.

Figure 5:
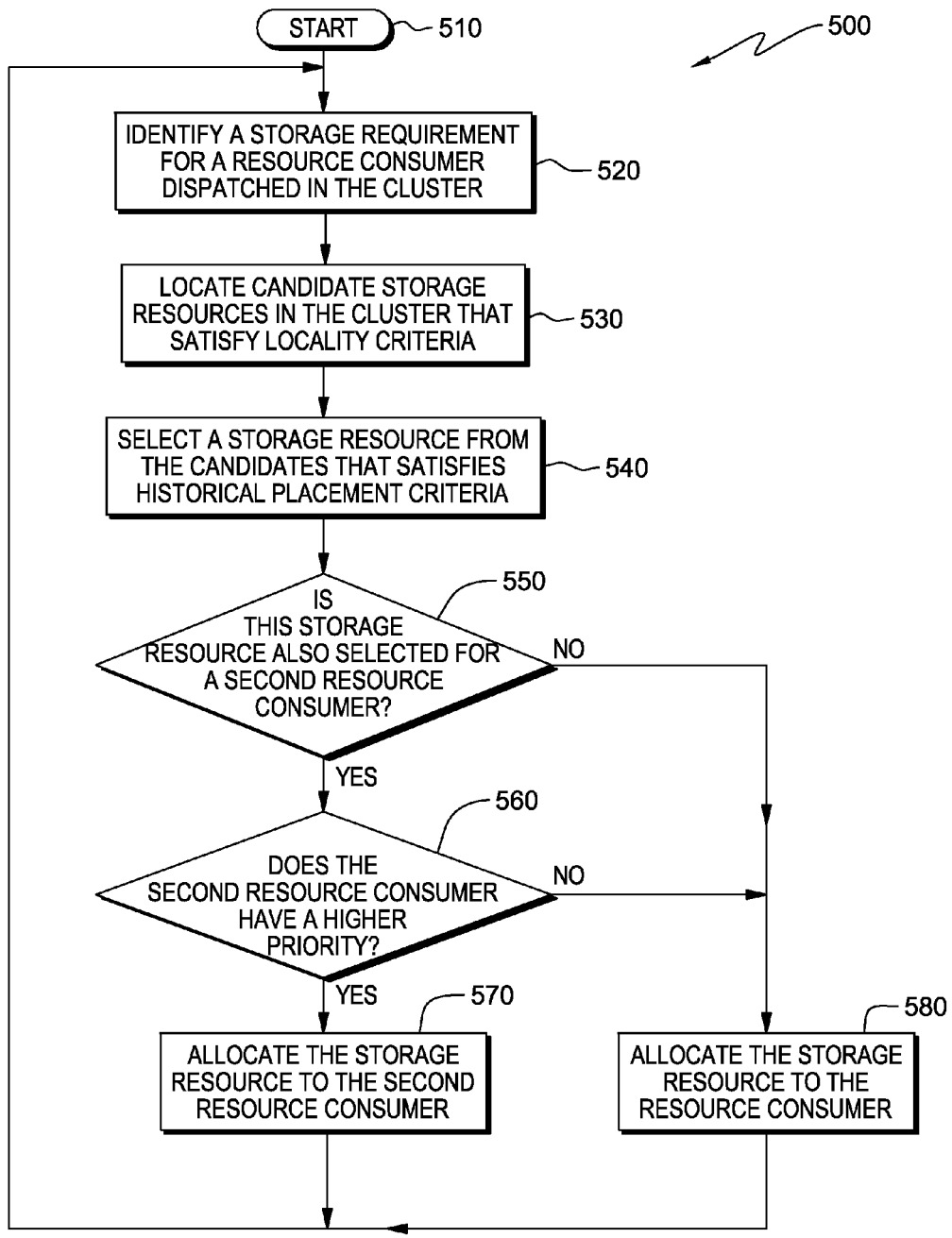
FIG. 5 is a flow diagram of an example method for storage management in a cluster of integrated computing systems.

FIG. 5 is a flow diagram of an example method 500 for storage management in a cluster of integrated computing systems. Method 500 begins at terminal 510. At functional block 520, a storage requirement for a data allocation set associated with a resource consumer dispatched in the cluster is identified. The resource consumer may be an application, service provider, or other consumer of storage resources within the cluster of integrated systems. The resource consumer is associated with a workload, which may include one or more data allocation sets.

At functional block 530, one or more candidate storage resources that can satisfy the storage requirement are located. The candidate storage resources also satisfy locality criteria for the workload associated with the data allocation set. "Locality" is used to describe how far away a workload is (communicatively) from the storage resource it is using. For example, a workload executing on a virtual machine in an integrated system that is using a locally attached storage resource has higher locality than if the workload were using a storage resource in a different integrated system.

To determine whether an available storage resource in the cluster satisfies locality criteria, a locality measurement is determined for the workload based on fulfilling the storage requirement with that particular storage resource. In some embodiments, a locality measurement may be determined for each available storage resource in the cluster, after which only those available resources that satisfy locality criteria are selected as candidate storage resources.

Locality measurements may be determined in any number of ways. For example, locality may be determined by assessing the number of routers and switches in the data path connecting a storage resource to a compute node. Furthermore, individual types of routers and switches may carry differing locality weights. The type of storage available on a storage node may affect locality. The physical distance between a storage resource and a compute node may influence locality measurements. In some embodiments, workload locality may be influenced by block distance, which measures the differences in block numbers between adjacent data references.

To determine whether a locality measurement associated with an available storage resource satisfies locality criteria, and therefore qualifies as a candidate storage resource, the locality measurement may be compared to a predetermined threshold. For example, all available storage resources in the cluster that, if selected to satisfy the storage requirement, would produce a locality measurement at or above a minimum acceptable locality measurement may be included as candidates. In other embodiments, the top number (e.g., the top 10) of available storage resources that produce the highest locality measurements may be included as candidates. In still other embodiments, the top percentage (e.g., the top 5%) of available storage resources that produce the highest locality measurements may be included as candidates. In addition to these examples, any locality criteria that produces at least one candidate storage resource based on locality from the available resources in the cluster is contemplated.

At functional block 540, a storage resource is selected from the candidate resources that satisfies allocation set activity criteria. Satisfying allocation set activity criteria may involve meeting particular requirements, may involve preferential selection based on a priority list of potential prior associations between the candidate and the allocation set, or may involve a determination that no candidate has had a previous association with the allocation set. In some embodiments, a storage resource may be selected that has previously hosted the allocation set associated with the storage requirement. In other embodiments, a storage resource may be selected that has a previous association with the workload or the resource consumer associated with the storage requirement. For example, a candidate may be currently hosting another allocation set associated with the workload. In some embodiments, allocation set activity criteria may provide that a candidate storage resource be recently associated with the allocation set, workload, or resource consumer, for example within a last defined period of time.

At decision block 550, if no other resource consumer is competing for the selected resource, then the selected resource is allocated to the resource consumer at functional block 580 and the method returns to functional block 520 to identify another storage requirement. But if, at decision block 550, the selected storage resource also satisfies the locality and allocation set activity criteria for a second resource consumer in the cluster, and if the second resource consumer has a higher priority than the resource consumer at decision block 560, then the selected resource is allocated to the second resource consumer at functional block 570 and the method returns to functional block 520 to select a new storage resource for the resource consumer. Priority determinations are discussed in more detail below.

Method 500 is a simplified example for illustrating concepts associated with storage management in a cluster of integrated computing systems, and embodiments may vary from this simplified example. For example, multiple storage requirements for multiple resource consumers may be identified and processed in parallel. Although method 500 recites a number of operations performed in a specific order, some embodiments may perform fewer or more operations in differing orders. Some embodiments may combine recited operations or break recited operations into multiple operations. Furthermore, some embodiments may perform entirely different operations.

FIG. 1 illustrates an example priority map 100 for use in a system for storage management in a cluster of integrated computing systems. Example priority map 100 may be described as a table of entries, with one or more entry for each storage resource consumer operating within the cluster and participating in the cluster-wide storage management scheme. In some embodiments, a resource consumer may have multiple entries, for example when the resource consumer has multiple data sets with differing priorities and/or associated directives. In some embodiments, entries can be added to the priority map when new resource consumers enter the cluster, and entries can be deleted when resource consumers exit the cluster. Furthermore, in some embodiments entries in a priority map may be modified over time, for example in response to changes to a particular resource consumer or a particular data set.

In example 100, a first storage resource consumer in the cluster is identified by resource consumer identifier 110. This first resource consumer is associated with directive 112, priority 114, and data allocation set 116. Directive 112 provides for storage control or influence from an external source; in some embodiments directive 112 may be considered an override feature. For example, directive 112 may indicate whether the first resource consumer is eligible or not eligible for inter-system data storage. For another example, directive 112 may indicate whether particular data associated with the first resource consumer is eligible for inter-system data storage, or whether that particular data is mandated for inter-system data storage. Directive 112 may be any indicator that provides information to the cluster-wide storage management system regarding how storage should be managed for the first resource consumer.

Priority 114 may be used by the cluster-wide storage management system to distinguish the relative importance of individual resource consumers operating in the cluster. Priority 114 may be represented as a number, as an ordered set of individual priorities, or in some other distinguishing manner. For example, priority 114 may represent a cluster-wide priority for the first resource consumer, and may be represented as an ordered set 150 including the individual consumer priority for the first resource consumer, the individual virtual machine priority for the virtual machine upon which the resource consumer is dispatched, and the individual system priority for the integrated system in which the virtual machine is hosted. Ordered set 150 may be evaluated in any number of ways, for example by summing the elements in the set, by multiplying the elements in the set, by polynomial evaluation of the elements in the set, or in some other manner.

Allocation set 116 may identify a particular data set associated with the first resource consumer. In this case, directive 112 and priority 114 may apply for allocation set 116 only, and the first resource consumer may have an additional entry in priority map 100 for other allocation sets. Allocation set 116 may refer to a specific LUN or another logical grouping of data, and in addition may refer to a particular storage location. Allocation set 116 may be specified using set 160, which includes an identifier for the data and an identifier for the storage location.

A second storage resource consumer in the cluster is identified by resource consumer identifier 120. This second resource consumer is associated with directive 122, priority 124, and allocation set 126. In example priority map 100, the second resource consumer has another entry in the table for a second allocation set 136. In this additional entry, resource consumer identifier 130 is the same as resource consumer identifier 120, and this entry associates the second resource consumer with directive 132 and priority 134 for allocation set 136.

Example priority map 100 may contain multiple entries, ending with an entry for a resource consumer in the cluster identified by resource consumer identifier 140 and associated with directive 142, priority 144, and allocation set 146. Although some embodiments may use a priority map identical to example priority map 100, some embodiments may use a priority map with fewer fields per entry, with more fields per entry, or with different fields per entry. In some embodiments, a priority map may take a form other than a table of entries, as long as the priority map is able to associate individual resource consumers in the cluster with their respective cluster-wide priorities and/or directives.

Figure 2:
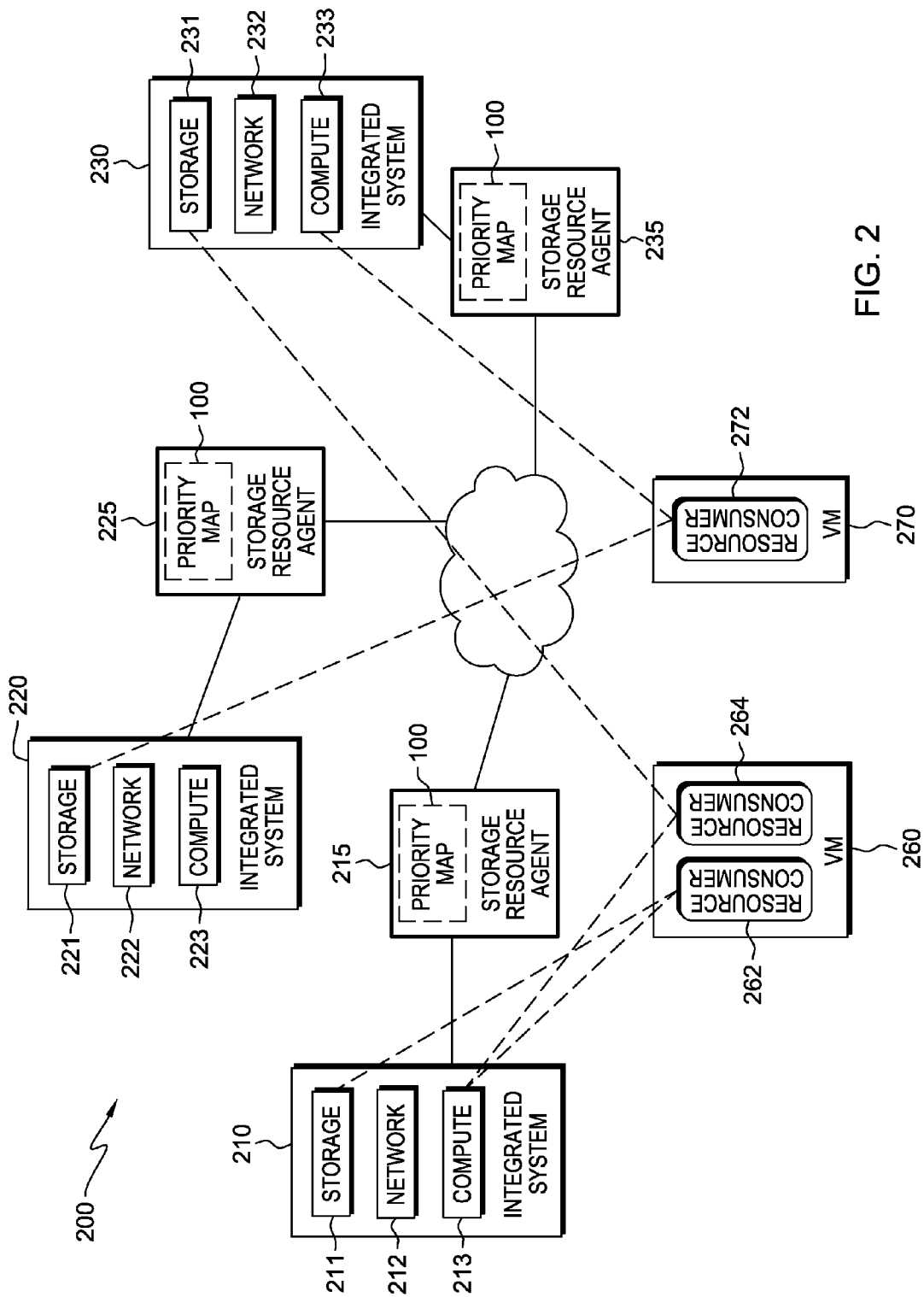
FIG. 2 is a block diagram of an example system for storage management in a cluster of integrated computing systems.

FIG. 2 is a block diagram of an example system 200 for storage management in a cluster of integrated computing systems. Integrated system 210 has an independently managed comprehensive infrastructure including compute nodes 213, storage nodes 211, and network nodes 212. Integrated system 210 has built-in virtualization across servers, storage, and networking to enable automated provisioning and scaling of storage resources within integrated system 210. Integrated system 220 has an independently managed comprehensive infrastructure including compute nodes 223, storage nodes 221, and network nodes 222. Integrated system 220 has built-in virtualization across servers, storage, and networking to enable automated provisioning and scaling of storage resources within integrated system 220. Integrated system 230 has an independently managed comprehensive infrastructure including compute nodes 233, storage nodes 231, and network nodes 232. Integrated system 230 has built-in virtualization across servers, storage, and networking to enable automated provisioning and scaling of storage resources within integrated system 230. Although example system 200 discloses three integrated systems, any number of integrated systems is contemplated.

A plurality of interconnected storage resource agents 215, 225, and 235 provide a framework for inter-system storage allocation and management within the cluster 200 of integrated systems 210, 220, and 230. In some embodiments, storage resource agents 215, 225, and 235 may be implemented as one or more software modules executing on processors in their respective integrated systems, with each software module comprising programming instructions to perform one or more of the functions disclosed herein, such as those described in FIG. 3, FIG. 4, and FIG. 5.

These storage resource agents may be assisted by priority map 100. The storage resource agents may create and maintain priority map 100, or system 200 may have another entity with responsibility for creating and maintaining priority map 100. Although priority map 100 is shown within each of storage resource agents 215, 225, and 235, this is to illustrate that each of the storage resource agents have access to the priority map. Priority map 100 may reside in only one storage resource agent, or may be stored in another location entirely. Without these storage resource agents 215, 225, and 235, applications and other storage resource consumers dispatched within the integrated systems 210, 220, and 230 would be restricted to storage resources within the integrated system on which the resource consumers are dispatched, i.e., intra-system resources, for fulfillment of their storage requirements.

Storage resource agents 215, 225, and 235 enable inter-system storage allocation within cluster 200. In some embodiments, storage resource agents have a peer relationship to each other, and no single resource agent is superior. Some embodiments may provide for a master agent to manage the storage resource agents. Storage resource agents may access information contained in a priority map, embodiments of which are described herein, to influence inter-storage allocation decisions. The storage resource agents may negotiate with each other within established rules when locating adequate and appropriate inter-system storage resources to meet the needs of resource consumers within the cluster of integrated systems. When a storage resource agent identifies a storage requirement, in some embodiments the other resource agents may be listening and may volunteer their free resources, while in other embodiments a storage resource agent may need to actively request resources from the other agents. Multiple competing storage requirements may be negotiated among multiple storage resource agents, taking into account directives, priorities, data access rates, and other considerations.

Each storage resource agent may monitor the storage needs of the applications and other storage resource consumers in its associated integrated system. In example system 200, storage resource agent 215 monitors integrated system 210, storage resource agent 225 monitors integrated system 220, and storage resource agent 235 monitors integrated system 230. When a storage requirement for a resource consumer is identified, a storage resource agent may coordinate with the other storage resource agents to locate an adequate and appropriate storage resource on another integrated system for allocation to the resource consumer. This coordination among storage resource agents may be accomplished with polling, interrupts, messaging, or any other method of facilitating communication between entities in a computer system. Adequate and appropriate storage resources may be, for example, those that maximize a locality measurement for the resource consumer's workload. Adequate and appropriate storage resources may also be, for example, those that primarily maximize a locality measurement for the resource consumer's workload, and secondarily promote resource allocations based on previous activity of the allocation set associated with the resource requirement.

In example 200, resource consumer 262 and resource consumer 264 are running on virtual machine 260. Virtual machine 260 is hosted on the computing resources from integrated system 210. Resource consumer 262 is allocated storage resources from integrated system 210, but resource consumer 264 is allocated storage resources from integrated system 230. Since the storage requirements of resource consumer 262 are met by the storage resources on integrated system 210, the storage resource agents in system 200 may or may not have been involved in the allocation. But in order for resource consumer 264 to be allocated storage resources from integrated system 230, at least storage resource agents 215 and 235 were involved in the allocation. In some embodiments, storage resource agent 225 may have been involved as well.

There are many circumstances which may result in resource consumer 264 being assigned resources from integrated system 230. For example, integrated system 210 may experience a storage hardware failure. For another example, integrated system 210 may deplete its available supply of storage resources, which would result, for example, if the storage requirements of the resource consumers in integrated system 210 increased beyond the storage supply of integrated system 210. For another example, a directive associated with resource consumer 264 may indicate that inter-system storage is acceptable or even preferred. In yet another example, resource consumer 264 may have a cluster-wide priority that is higher than the cluster-wide priority of another resource consumer competing for the same storage resources on integrated system 230. In any event, storage resource agent 215 identified a storage requirement for resource consumer 264 and communicated with the other storage resource agents in the cluster to locate adequate storage resources, resulting in an allocation from integrated system 230.

Also in example system 200, resource consumer 272 is running on virtual machine 270. Virtual machine 270 is hosted on the computing resources from integrated system 230. At some point, storage resource agent 235 identified a storage requirement for resource consumer 272, communicated with the other storage resource agents in the cluster to locate adequate storage resources, and this communication resulted in an allocation of storage resources from integrated system 220 to meet the storage requirements of resource consumer 272. There are a number of reasons why resource consumer 272 dispatched in integrated system 230 might access storage resources from integrated system 220, while resource consumer 264 dispatched in integrated system 210 accesses storage resources from integrated system 230. In one example, resource consumer 264 may have been allocated the storage resources before resource consumer 272 needed storage resources. In another example, resource consumer 264 may have been competing for resources simultaneously with resource consumer 272, and resource consumer 264 may have a higher priority than resource consumer 272. In another example, resource consumer 272 may have been required to surrender system 230 storage resources in favor of the higher-priority resource consumer 264.

The storage resource agents may later determine that the data from resource consumer 272 may be relocated to the storage resources in integrated system 230, perhaps as a swap with the data from resource consumer 264. This determination could be made, for example, in furtherance of a cluster-wide storage policy of minimizing inter-system data storage, in furtherance of a cluster-wide storage policy of balancing distribution of available storage resources in the cluster, or in furtherance of some other cluster-wide storage policy. After the relocation, resource consumer 272 would then have an intra-system storage allocation rather than an inter-system storage allocation, and would likely experience an increase in workload performance.

Figure 3:
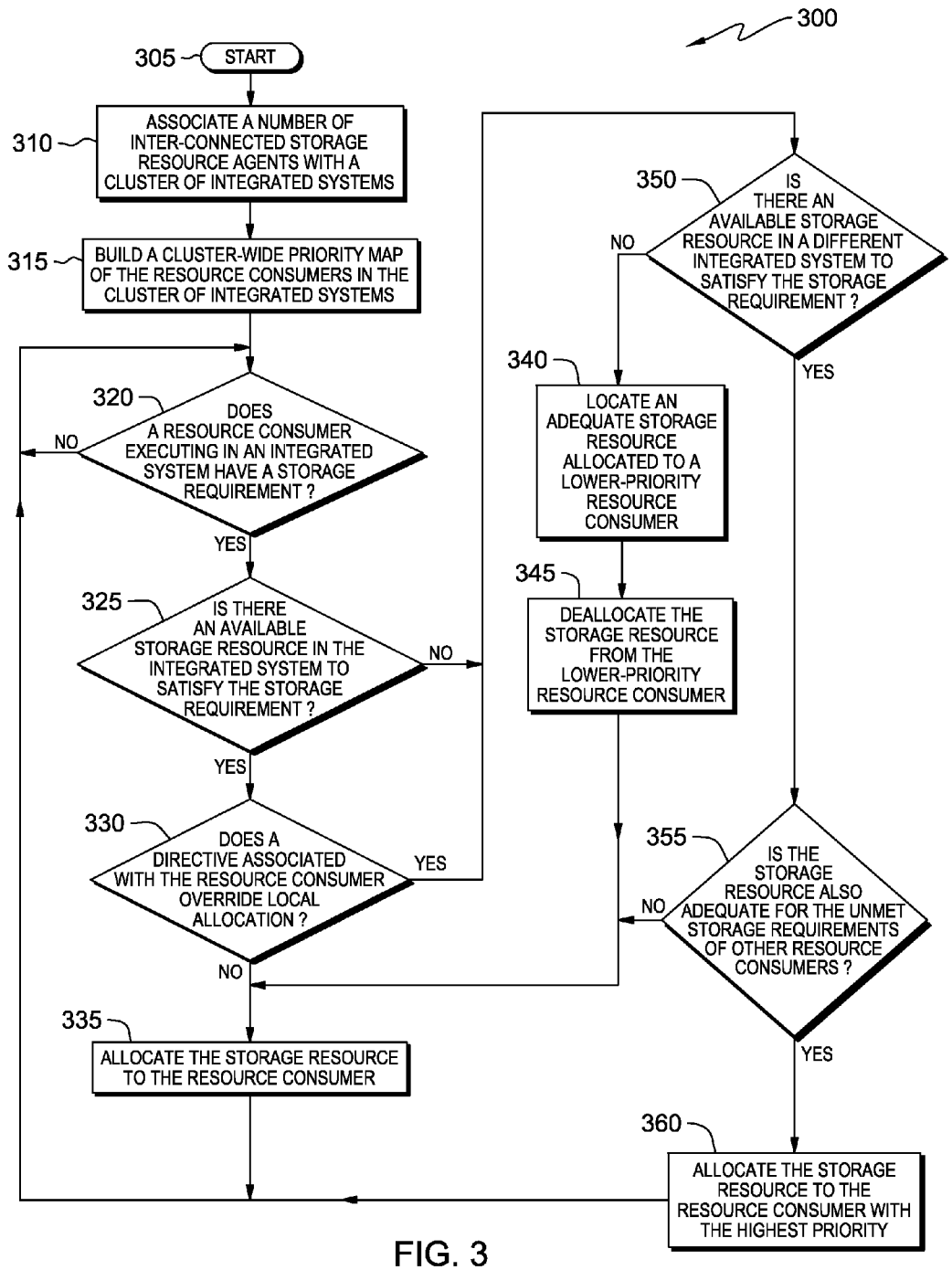
FIG. 3 is a flow diagram of an example method for storage management in a cluster of integrated computing systems.

FIG. 3 is a flow diagram of an example method 300 for storage management in a cluster of integrated computing systems. Method 300 begins at terminal 305. At functional block 310, a number of inter-connected storage resource agents are associated with a number of integrated computing systems, forming a cluster of integrated systems. At functional block 315, a cluster-wide priority map associating resource consumers and data with directives and priorities is built. At decision block 320, when a resource consumer dispatched somewhere within the cluster has a storage requirement, the method proceeds to decision block 325. If the storage requirement can be satisfied by an intra-system storage resource, the method proceeds to decision block 330. If no directive associated with the resource consumer overrides an intra-system allocation, then an intra-system storage resource sufficient to satisfy the storage requirement is allocated to the resource consumer at functional block 335, and the method returns to decision block 320 to wait for another storage requirement.

If the storage requirement is not satisfied by an intra-system storage resource at decision block 325, or if a directive associated with the resource consumer overrides an intra-system allocation at decision block 330, the method proceeds to decision block 350. If the storage resource agents determine that an inter-system storage resource is available to satisfy the storage requirement, the method proceeds to decision block 355. If there is no competition for the inter-system resource, the inter-system resource is allocated to the resource consumer at functional block 335, and the method returns to decision block 320 to wait for another storage requirement. But if the inter-system storage resource can also satisfy a storage requirement for another resource consumer dispatched somewhere within the cluster, then the inter-system storage resource is allocated to the resource consumer with the highest priority at functional block 360. The method then returns to decision block 320 to wait for another storage requirement.

If the storage resource agents determine that an inter-system storage resource is not available to satisfy the storage requirement at decision block 350, the method proceeds to functional block 340. The storage resource agents then identify a storage resource within the cluster that is currently allocated to a resource consumer with a lower priority and deallocate the storage resource at functional block 345. The reclaimed storage resource is then allocated to the higher-priority resource consumer at functional block 335, and the method returns to decision block 320 to wait for another storage requirement.

Method 300 is a simplified example for illustrating concepts associated with storage management in a cluster of integrated computing systems, and embodiments may vary from this simplified example. For example, multiple storage requirements for multiple resource consumers may be identified and processed in parallel. Although method 300 recites a number of operations performed in a specific order, some embodiments may perform fewer or more operations in differing orders. Some embodiments may combine recited operations or break recited operations into multiple operations. Furthermore, some embodiments may perform entirely different operations.

Some embodiments may combine features from method 300 with features from method 500, described above. For example, in an embodiment including method 300, the determining at decision block 350 whether the storage requirement can be satisfied by an inter-system storage resource may include locating one or more candidate storage resources that can satisfy locality criteria for the workload at functional block 530. The determining at decision block 350 may further include selecting a storage resource from the candidate resources that satisfies allocation set activity criteria at functional block 540. Other embodiments may combine features from method 300 with features from method 500 in other ways.

Figure 4:
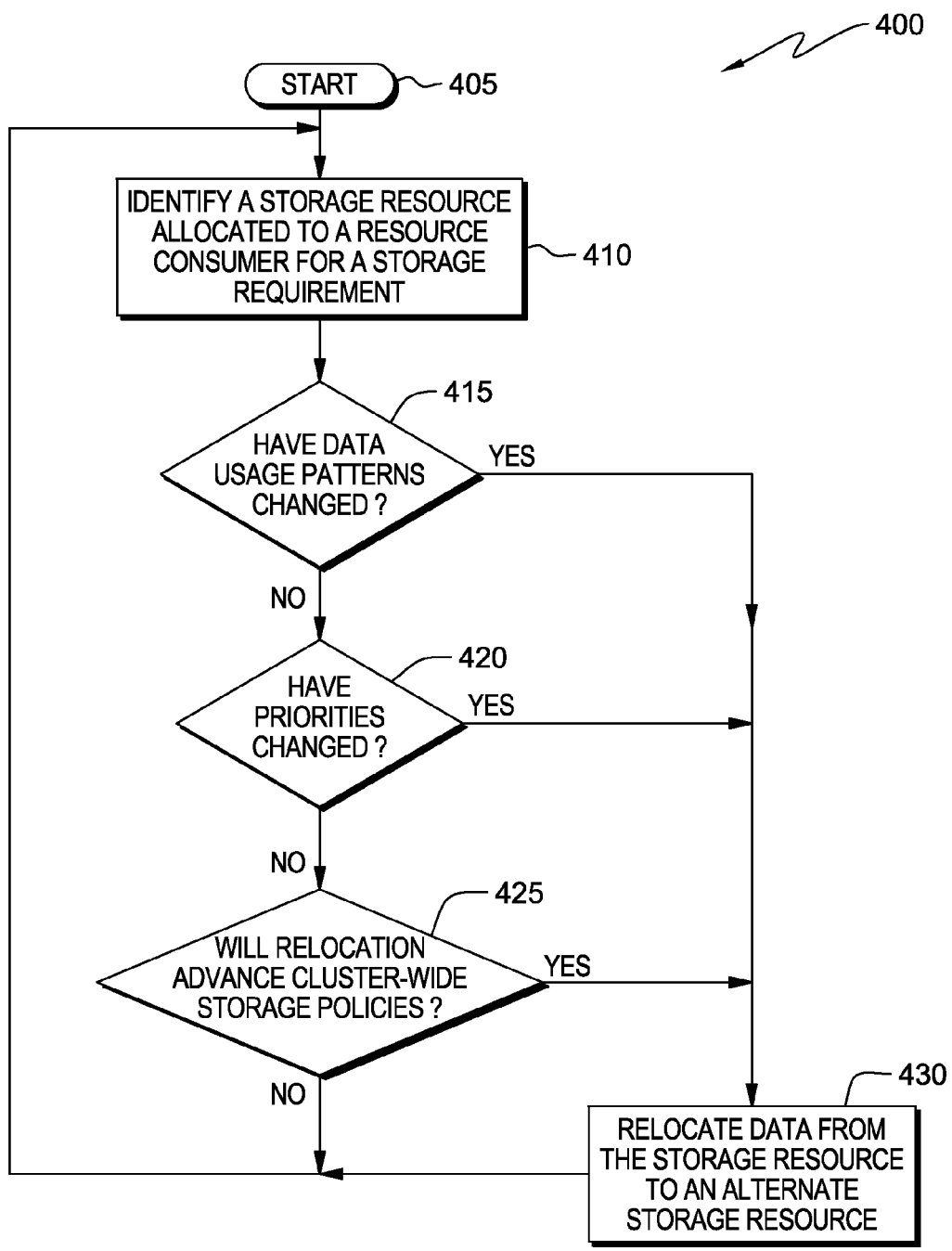
FIG. 4 is a flow diagram of an example method for storage management in a cluster of integrated computing systems.

FIG. 4 is a flow diagram of an example method 400 for another aspect of storage management in a cluster of integrated computing systems. Method 400 begins at terminal 405. At functional block 410, the storage resource agents identify a storage resource allocated to a resource consumer operating in the cluster. At decision block 415, if data usage patterns have changed for data stored on this storage resource, this storage resource may no longer be the most appropriate storage resource for this data. If data usage patterns have changed such that the current allocation is no longer appropriate or can be improved, then data from the storage resource may be relocated to an alternate and more appropriate storage resource at functional block 430. For example, this data may be less frequently accessed than previously, and may be a good candidate for relocation from intra-system storage to inter-system storage. Conversely, this data may be more frequently accessed than previously, and may be a good candidate for relocation from inter-system storage to intra-system storage.

If data usage patterns have not significantly changed at decision block 415, the method proceeds to decision block 420. If a priority related to data stored on this storage resource has changed, this storage resource may no longer be the most appropriate storage resource for this data. This priority may be a data-specific priority, an individual resource consumer priority, a virtual machine priority, an integrated system priority, or a cluster-wide priority incorporating some or all of these priorities. If a priority has changed such that the current allocation is no longer appropriate or can be improved, then data from the storage resource may relocated to an alternate and more appropriate storage resource at functional block 430.

If priorities have not significantly changed at decision block 420, the method proceeds to decision block 425. If relocating the data stored on this storage resource will advance one or more cluster-wide storage policies, then data from the storage resource may be relocated to an alternate and more appropriate storage resource at functional block 430. For example, a cluster-wide storage policy could be a policy of minimizing inter-system data storage or balancing distribution of available storage resources in the cluster. Cluster-wide storage policies may be defined during a configuration process associated with clustering together multiple integrated systems.

Although method 400 recites a number of operations performed in a specific order, some embodiments may perform fewer or more operations in differing orders. Some embodiments may combine recited operations or break recited operations into multiple operations. Furthermore, some embodiments may perform entirely different operations.

The major components of any computer system as described herein may include one or more processors, a main memory, a terminal interface, a storage interface, an I/O (Input/Output) device interface, and a network interface, all of which are communicatively coupled, directly or indirectly, for inter-component communication via a memory bus, an I/O bus, and an I/O bus interface unit. The computer system may contain one or more general-purpose programmable central processing units (CPUs). In an embodiment, the computer system may contain multiple processors typical of a relatively large system; however, in another embodiment the computer system may alternatively be a single CPU system. Each processor may execute instructions stored in the main memory and may comprise one or more levels of on-board cache. Main memory may comprise a random-access semiconductor memory, storage device, or storage medium (either volatile or non-volatile) for storing or encoding data and programs. Main memory may alternatively represent the entire virtual memory of the computer system, and may also include the virtual memory of other computer systems coupled to the computer system or connected via a network. Main memory may be conceptually a single monolithic entity, but in some embodiments, main memory is more complex, such as a hierarchy of caches and other memory devices. Main memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Embodiments described herein may be in the form of a system, a method, or a computer program product. Accordingly, aspects of embodiments of the disclosure may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the disclosure may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the disclosure. But, any particular program nomenclature is used merely for convenience, and thus embodiments of the disclosure are not limited to use solely in any specific application identified and/or implied by such nomenclature. The example environments are not intended to limit embodiments of the present disclosure. Indeed, other alternative hardware and/or program environments may be used without departing from the scope of embodiments of the disclosure.

While embodiments of the disclosure have been described with reference to the specific aspects thereof, those skilled in the art will be able to make various modifications to the described aspects without departing from the true spirit and scope of the various embodiments. The terms and descriptions used herein are set forth by way of illustration only and are not meant as limitations. Those skilled in the art will recognize that these and other variations are possible within the spirit and scope of the embodiments as defined in the following claims and their equivalents.

What is claimed is:

1. A method for managing data storage resources in a cluster of integrated systems, each integrated system having an integrated resource infrastructure, the integrated resource infrastructure including an at least one compute node and intra-system storage, the intra-system storage including data storage resources in an at least one storage node, the integrated resource infrastructure of each integrated system managed independently of the integrated resource infrastructure of each of the other integrated systems in the cluster, the method comprising:

associating a storage resource agent with each integrated system, each storage resource agent included in a plurality of distributed storage resource agents, the plurality of distributed storage resource agents communicatively interconnected and managing inter-system storage, the inter-system storage including the data storage resources;

forming, by at least two storage resource agents associated with the integrated systems, an inter-system storage priority map, the contents of the inter-system storage priority map synchronized by the at least two storage resource agents, the inter-system storage priority map including data set allocation criteria associated with each data allocation set, the data set allocation criteria associated with each data allocation set including at least one of a storage directive, an inter-system storage priority for accessing data storage resources in the inter-system storage, and data allocation set attributes descriptive of the data allocation set;

identifying, by a first storage resource agent associated with a first integrated system in the cluster, a first data storage requirement for a first resource consumer, the first data storage requirement associated with a first data allocation set, the first data allocation set associated with a workload of the first resource consumer, the first data allocation set based at least in part on data associated with the first data storage requirement, the first resource consumer dispatched on a first virtual machine hosted on a first compute node included in the first integrated system;

locating, by the first storage resource agent and an at least one second storage resource agent associated with an integrated system that is not the first integrated system, an at least one candidate data storage resource in the inter-system storage, the at least one candidate data storage resource within the data storage resources of the intra-system storage of at least one integrated system within the cluster;

selecting a data storage resource from the at least one candidate data storage resource, the selecting utilizing first data set allocation criteria included in the inter-system storage priority map, the first data set allocation criteria associated with the first data allocation set, the selected data storage resource satisfying a data allocation criterion included in the first data set allocation criteria; and allocating the selected data storage resource to the first resource consumer to satisfy the first data storage requirement.

2. The method of claim 1, wherein the method further includes the at least one candidate data storage resource satisfying a locality criterion associated with the workload, wherein the at least one candidate data storage resource is associated with a locality measurement based at least in part on the length of a transmission path between the at least one candidate storage resource and the first compute node, wherein the locality measurement satisfies the locality criterion, wherein the selecting the data storage resource further includes the selected data storage resource satisfying a data allocation set activity criterion, wherein the data allocation set activity criterion includes a previous association, wherein the previous association is based at least in part on the data allocation set attributes included in the inter-system storage priority map, and wherein the data allocation set activity criterion is selected from the group consisting of:

a first requirement that the data allocation set has been previously hosted by the selected data storage resource, the data allocation set not presently hosted by the selected data storage resource;

a second requirement that the workload be previously associated with the selected data storage resource, the previous association including the selected data storage resource hosting, within a defined period of time, any data allocation set associated with the workload; and a third requirement that first resource consumer be previously associated with the selected data storage resource, the previous association including the selected data storage resource hosting, within a defined period of time, any data allocation set associated with the first resource consumer.

3. The method of claim 1, wherein the first resource consumer has a first inter-system storage priority for accessing data storage resources in the inter-system storage, wherein a second resource consumer dispatched on a second virtual machine hosted on a second compute node in a second integrated system has a second inter-system storage priority for accessing data storage resources in the inter-system storage, and wherein the selected data storage resource is concurrently selected to satisfy a second data storage requirement for the second resource consumer, the method further comprising:

determining, by the storage resource agents associated with the integrated systems, using the inter-system storage priority map, that the first inter-system storage priority is higher than the second inter-system storage priority.

4. The method of claim 3, wherein a plurality of resource consumers is dispatched on a plurality of virtual machines hosted on the plurality of compute nodes in the cluster of integrated systems, wherein each resource consumer has a consumer inter-system storage priority for accessing data storage resources in the-inter-system storage, relative to all resource consumers in the cluster, wherein each virtual machine has a virtual machine inter-system storage priority for accessing data storage resources in the-inter-system storage, relative to all virtual machines in the cluster, and wherein each integrated system has a system inter-system storage priority for accessing data storage resources in the-inter-system storage, relative to all integrated systems in the cluster, wherein each of the consumer, virtual machine, and system inter-system storage priorities for each resource consumer, virtual machine, and integrated system in the cluster are included the inter-system storage priority map, the method further comprising:

identifying, from the inter-system storage priority map, a first consumer inter-system storage priority for the first resource consumer;

identifying, from the inter-system storage priority map, a first virtual machine inter-system storage priority for the first virtual machine;

identifying, from the inter-system storage priority map, a first system inter-system storage priority for the first integrated system;

identifying, from the inter-system storage priority map, a second consumer inter-system storage priority for the second resource consumer;

identifying, from the inter-system storage priority map, a second virtual machine inter-system storage priority for the second virtual machine;

identifying, from the inter-system storage priority map, a second system inter-system storage priority for the second integrated system;

calculating the first inter-system storage priority according to a weighted formula based on at least one of the first consumer inter-system storage priority, the first virtual machine inter-system storage priority, and the first system inter-system storage priority; and calculating the second inter-system storage priority according to the weighted formula based on at least one of the second consumer inter-system storage priority, the second virtual machine inter-system storage priority, and the second system inter-system storage priority.

5. The method of claim 1, wherein the selected data storage resource is not included in the intra-system storage in the first integrated system.

6. The method of claim 1, wherein the data set allocation criteria includes an inter-system storage criterion, wherein the allocating the selected data storage resource to the first resource consumer is based at least in part on the selected data storage resource satisfying the inter-system storage criterion, wherein the selected data storage resource satisfying the inter-system storage criterion is based at least in part on the data allocation set attributes included in the inter-system storage priority map, and wherein the inter-system storage criterion is selected from the group consisting of:

a first directive indicating that the first resource consumer is eligible to use data storage resources included in the inter-system data storage, the first directive associated with the first resource consumer;

a second directive indicating that the data associated with the first data storage requirement is eligible to use data storage resources included in the inter-system data storage, the second directive associated with the first resource consumer;

a first determination that the first resource consumer has an inter-system storage priority for accessing data storage resources in the inter-system storage below an inter-system storage priority threshold; and a second determination that the first resource consumer has a first inter-system storage priority for accessing data storage resources in the inter-system storage higher than a second inter-system storage priority for accessing data storage resources in the inter-system storage, a second resource consumer having the second inter-system storage priority.

7. The method of claim 1, wherein the first resource consumer has a first inter-system storage priority for accessing data storage resources in the inter-system storage, and wherein the allocating the selected data storage resource comprises:

determining that the selected data storage resource is allocated to a second resource consumer, the second resource consumer having a second inter-system storage priority for accessing data storage resources in the inter-system storage, the second inter-system storage priority lower than the first inter-system storage priority;

deallocating the selected data storage resource from the second resource consumer; and allocating, subsequent to the de-allocating, the selected data storage resource to the first resource consumer.

8. The method of claim 1, further comprising:

locating, using the inter-system storage map, subsequent to the allocating the selected data storage resource to the first resource consumer, an alternate data storage resource in the inter-system storage; and relocating the first data allocation set from the selected data storage resource to the alternate data storage resource, the relocating satisfying an inter-system storage relocation criterion.

9. The method of claim 8, wherein the inter-system storage relocation criterion is selected from the group consisting of:

a determination that the first resource consumer has an-inter-system storage priority, included in the inter-system priority map, for accessing data storage resources in the-inter-system storage above an inter-system storage priority threshold;

a first inter-system storage policy of prioritizing allocation of intra-system data storage resources over allocation of data storage resources in inter-system storage; and a second inter-system storage policy of balancing distribution of available data storage resources in inter-system and intra-system storage in the cluster.

10. A computer program product for managing data storage resources in a cluster of integrated systems, each integrated system having an integrated resource infrastructure, the integrated resource infrastructure including an at least one compute node and intra-system storage, the intra-system storage including data storage resources in an at least one storage node, the integrated resource infrastructure of each integrated system managed independently of the integrated resource infrastructure of each of the other integrated systems in the cluster, the computer program product comprising a non-transitory computer-readable storage medium having program code embodied therewith, the program code executable by a computer system to perform a method comprising:

associating a storage resource agent with each integrated system, each storage resource agent included in a plurality of distributed storage resource agents, the plurality of distributed storage resource agents communicatively interconnected and managing inter-system storage, the inter-system storage including the data storage resources;

forming, by at least two storage resource agents associated with the integrated systems, an inter-system storage priority map, the contents of the inter-system storage priority map synchronized by the at least two storage resource agents, the inter-system storage priority map including data set allocation criteria associated with each data allocation set, the data set allocation criteria associated with each data allocation set including at least one of a storage directive, an inter-system storage priority for accessing data storage resources in the inter-system storage, and data allocation set attributes descriptive of the data allocation set;

identifying, by a first storage resource agent associated with a first integrated system in the cluster, a first data storage requirement for a first resource consumer, the first data storage requirement associated with a first data allocation set, the first data allocation set associated with a workload of the first resource consumer, the first data allocation set based at least in part on data associated with the first data storage requirement, the first resource consumer dispatched on a first virtual machine hosted on a first compute node included in the first integrated system, locating, by the first storage resource agent and an at least one second storage resource agent associated with an integrated system that is not the first integrated system, an at least one candidate data storage resource in the inter-system storage, the at least one candidate data storage resource within the data storage resources of the intra-system storage of at least one integrated system within the cluster;

selecting a data storage resource from the at least one candidate data storage resource, the selecting utilizing first data set allocation criteria included in the inter-system storage priority map, the first data set allocation criteria associated with the first data allocation set, the selected data storage resource satisfying a data allocation criterion included in the first data set allocation criteria; and allocating the selected data storage resource to the first resource consumer to satisfy the first data storage requirement.

11. The computer program product of claim 10, wherein the first resource consumer has a first inter-system storage priority for accessing data storage resources in the inter-system storage, wherein a second resource consumer dispatched on a second virtual machine hosted on a second compute node in a second integrated system has a second inter-system storage priority for accessing data storage resources in the inter-system storage, and wherein the selected data storage resource is concurrently selected to satisfy a second data storage requirement for the second resource consumer, the method further comprising:

determining, by the storage resource agents associated with the integrated systems, using the inter-system storage priority map, that the first inter-system storage priority is higher than the second inter-system storage priority.

12. The computer program product of claim 11, wherein a plurality of resource consumers is dispatched on a plurality of virtual machines hosted on the plurality of compute nodes in the cluster of integrated systems, wherein each resource consumer has a consumer inter-system storage priority for accessing data storage resources in the-inter-system storage, relative to all resource consumers in the cluster, wherein each virtual machine has a virtual machine inter-system storage priority for accessing data storage resources in the-inter-system storage, relative to all virtual machines in the cluster, and wherein each integrated system has a system inter-system storage priority for accessing data storage resources in the-inter-system storage, relative to all integrated systems in the cluster, wherein each of the consumer, virtual machine, and system inter-system storage priorities for each resource consumer, virtual machine, and integrated system in the cluster are included the inter-system storage priority map, the method further comprising:

identifying, from the inter-system storage priority map, a first consumer inter-system storage priority for the first resource consumer;

identifying, from the inter-system storage priority map, a first virtual machine inter-system storage priority for the first virtual machine;

identifying, from the inter-system storage priority map, a first system inter-system storage priority for the first integrated system;

identifying, from the inter-system storage priority map, a second consumer inter-system storage priority for the second resource consumer;

identifying, from the inter-system storage priority map, a second virtual machine inter-system storage priority for the second virtual machine;

identifying, from the inter-system storage priority map, a second system inter-system storage priority for the second integrated system;

calculating the first-inter-system storage priority according to a weighted formula based on at least one of the first consumer inter-system storage priority, the first virtual machine inter-system storage priority, and the first system inter-system storage priority; and calculating the second-inter-system storage priority according to the weighted formula based on at least one of the second consumer inter-system storage priority, the second virtual machine inter-system storage priority, and the second system inter-system storage priority.

13. The computer program product of claim 10, wherein the data set allocation criteria includes an inter-system storage criterion, wherein the allocating the selected data storage resource to the first resource consumer is based at least in part on the selected data storage resource satisfying the inter-system storage criterion, wherein the selected data storage resource satisfying the inter-system storage criterion is based at least in part on the data allocation set attributes included in the inter-system storage priority map, and wherein the inter-system storage criterion is selected from the group consisting of:

a first directive indicating that the first resource consumer is eligible to use data storage resources included in the inter-system storage, the first directive associated with the first resource consumer;

a second directive indicating that data associated with the first storage requirement is eligible to use data storage resources included in the inter-system storage, the second directive associated with the first resource consumer;

a first determination that the first resource consumer has an inter-system storage priority for accessing data storage resources in the inter-system storage below an inter-system storage priority threshold; and a second determination that the first resource consumer has a first inter-system storage priority for accessing data storage resources in the inter-system storage higher than a second inter-system storage priority for accessing data storage resources in the inter-system storage, a second resource consumer having the second inter-system storage priority.

14. The computer program product of claim 10, the method further comprising:

locating, using the inter-system storage map, subsequent to the allocating the selected data storage resource to the first resource consumer, an alternate data storage resource in the inter-system storage; and relocating the first data allocation set from the selected data storage resource to the alternate data storage resource, the relocating satisfying an inter-system storage relocation criterion.

15. The computer program product of claim 14, wherein the inter-system storage relocation criterion is selected from the group consisting of:
   a determination that the first resource consumer has an inter-system storage priority, included in the inter-system priority map, for accessing data storage resources in the inter-system storage above an inter-system storage priority threshold;
   a first inter-system storage policy of prioritizing allocation of intra-system data storage resources over allocation of inter-system data storage resources; and
   a second inter-system storage policy of balancing distribution of available inter-system and intra-system data storage resources in the cluster.

16. The computer program product of claim 10, wherein the method further includes the at least one candidate data storage resource satisfying a locality criterion associated with the workload, wherein the at least one candidate data storage resource is associated with a locality measurement based at least in part on the length of a transmission path between the at least one candidate storage resource and the first compute node, wherein the locality measurement satisfies the locality criterion, wherein the selecting the data storage resource further includes the selected data storage resource satisfying a data allocation set activity criterion, wherein the data allocation set activity criterion includes a previous association, wherein the previous association is at least in part based on the data allocation set attributes included in the inter-system storage priority map, and wherein the data allocation set activity criterion is selected from the group consisting of:
   a first requirement that the data allocation set has been previously hosted by the selected data storage resource, the data allocation set not presently hosted by the selected data storage resource;
   a second requirement that the workload be previously associated with the selected data storage resource, the previous association including the selected data storage resource hosting, within a defined period of time, any data allocation set associated with the workload; and
   a third requirement that the first resource consumer be previously associated with the selected data storage resource, the previous association including the selected data storage resource hosting, within a defined period of time, any data allocation set associated with the first resource consumer.

17. A computer system for managing data storage resources in a cluster of integrated systems, each integrated system having an integrated resource infrastructure, the integrated resource infrastructure including an at least one compute node and intra-system storage, the intra-system storage including data storage resources in an at least one storage node, the integrated resource infrastructure of each integrated system managed independently of the integrated resource infrastructure of each of the other integrated systems in the cluster, the computer system comprising:
   a memory; and
   at least one processor in communication with the memory, wherein the computer system is configured to perform a method, the method comprising:
      associating a storage resource agent with each integrated system, each storage resource agent included in a plurality of distributed storage resource agents, the plurality of distributed storage resource agents communicatively interconnected and managing inter-system storage, the inter-system storage including the data storage resources;
      forming, by at least two storage resource agents associated with the integrated systems, an inter-system storage priority map, the contents of the inter-system storage priority map synchronized by the at least two storage resource agents, the inter-system storage priority map including data set allocation criteria associated with each data allocation set, the data set allocation criteria associated with each data allocation set including at least one of a storage directive, an inter-system storage priority for accessing data storage resources in the inter-system storage, and data allocation set attributes descriptive of the data allocation set;
      identifying, by a first storage resource agent associated with a first integrated system in the cluster, a first data storage requirement for a first resource consumer, the first data storage requirement associated with a first data allocation set, the first data allocation set associated with a workload of the first resource consumer, the first data allocation set based at least in part on data associated with the first data storage requirement, the first resource consumer dispatched on a first virtual machine hosted on a first compute node included in the first integrated system;
      locating, by the first storage resource agent and an at least one second storage resource agent associated with an integrated system that is not the first integrated system, an at least one candidate data storage resource in the inter-system storage, the at least one candidate data storage resource within the data storage resources of the intra-system storage of at least one integrated system within the cluster;
      selecting a data storage resource from the at least one candidate data storage resource, the selecting utilizing first data set allocation criteria included in the inter-system storage priority map, the first data set allocation criteria associated with the first data allocation set, the selected data storage resource satisfying a data allocation criterion included in the first data set allocation criteria; and
      allocating the selected data storage resource to the first resource consumer to satisfy the first data storage requirement.

18. The computer system of claim 17, wherein the method further includes the at least one candidate data storage resource satisfying a locality criterion associated with the workload, wherein the at least one candidate data storage resource is associated with a locality measurement based at least in part on the length of a transmission path between the at least one candidate storage resource and the first compute node, wherein the locality measurement satisfies the locality criterion, wherein the selecting the data storage resource further includes the selected data storage resource satisfying a data allocation set activity criterion, wherein the data allocation set activity criterion includes a previous association, wherein the previous association is at least in part based on the data allocation set attributes included in the inter-system storage priority map, and wherein the data allocation set activity criterion is selected from the group consisting of:
   a first requirement that the data allocation set be previously associated with the selected data storage resource, the previous association including the selected data storage resource hosting, within a defined period of time, the data allocation set, the data allocation set not presently hosted by the selected data storage resource;
- a second requirement that the workload be previously associated with the selected data storage resource, the previous association including the selected data storage resource hosting, within a defined period of time, any data allocation set associated with the workload; and
- a third requirement that the first resource consumer be previously associated with the selected data storage resource, the previous association including the selected data storage resource hosting, within a defined period of time, any data allocation set associated with the first resource consumer.

19. The computer system of claim 17, wherein the first resource consumer has a first inter-system storage priority for accessing data storage resources in the inter-system storage, wherein a second resource consumer dispatched on a second virtual machine hosted on a second compute node in a second integrated system has a second inter-system storage priority for accessing data storage resources in the inter-system storage, wherein the selected data storage resource is concurrently selected to satisfy a second data storage requirement for the second resource consumer, and wherein the method further comprises:
   determining, by the storage resource agents associated with the integrated systems, using the inter-system storage priority map, that the first inter-system storage priority is higher than the second inter-system storage priority.

20. The computer system of claim 17, wherein the method further includes the at least one candidate data storage resource satisfying a locality criterion associated with the workload, wherein the at least one candidate data storage resource is associated with a locality measurement based at least in part on the length of a transmission path between the at least one candidate storage resource and the first compute node, wherein the locality measurement satisfies the locality criterion, wherein the selecting the data storage resource further includes the selected data storage resource satisfying a data allocation set activity criterion, wherein the data allocation set activity criterion includes a previous association, wherein the previous association is at least in part based on the data allocation set attributes included in the inter-system storage priority map, and wherein the data allocation set activity criterion is selected from the group consisting of:
- a first requirement that the data allocation set has been previously hosted by the selected data storage resource, the data allocation set not presently hosted by the selected data storage resource;
- a second requirement that the workload be previously associated with the selected data storage resource, the previous association including the selected data storage resource hosting, within a defined period of time, any data allocation set associated with the workload; and
- a third requirement that the first resource consumer be previously associated with the selected data storage resource, the previous association including the selected data storage resource hosting, within a defined period of time, any data allocation set associated with the first resource consumer.

\* \* \* \* \*